US008521666B2

(12) United States Patent
Jarmulak

(10) Patent No.: US 8,521,666 B2
(45) Date of Patent: Aug. 27, 2013

(54) CASE ACQUISITION FOR INCREMENTAL CASE-BASED REASONING SYSTEM

(75) Inventor: Jacek Jarmulak, Grapevine, TX (US)

(73) Assignee: Resolvity, Inc., Irving, TX (US)

( * ) Notice: Subject to any disclaimer, the term of this patent is extended or adjusted under 35 U.S.C. 154(b) by 0 days.

(21) Appl. No.: 13/536,239

(22) Filed: Jun. 28, 2012

(65) Prior Publication Data

US 2012/0265721 A1     Oct. 18, 2012

Related U.S. Application Data

(62) Division of application No. 12/313,920, filed on Nov. 26, 2008, now abandoned.

(60) Provisional application No. 61/012,815, filed on Dec. 11, 2007.

(51) Int. Cl.
*G06N 5/02*     (2006.01)

(52) U.S. Cl.
USPC .......................................................... 706/12

(58) Field of Classification Search
USPC ............................................... 706/46; 707/3
See application file for complete search history.

(56) References Cited

U.S. PATENT DOCUMENTS

| | | |
|---|---|---|
| 5,581,664 A | 12/1996 | Allen et al. |
| 5,717,835 A | 2/1998 | Hellerstein |
| 6,081,798 A | 6/2000 | Johnson et al. |
| 2004/0193582 A1* | 9/2004 | Smyth ................................ 707/3 |

OTHER PUBLICATIONS

A. Aamodt, E. Plaza, "Case-Based Reasoning: Foundational Issues, Methodological Variations, and System Approaches", in: AI Communications, vol. 7: 1, pp. 39-59, IOS Press, (1994).
P. Cunningham and B. Smyth, "A Comparison of Model-Based and Incremental Case-Based Approaches to Electronic Fault Diagnosis", in: AAAI '94 Workshop on CBR, D. Aha ed., Seattle, Washington, Aug. 1994.
M. Manago, R. Bergman, S. Wess, R. Traphoner, et al. "CASUEL: A Common Case Representation Language—Version 2.0.2", ESPRIT-Project 6322, Deliverable D1, INRECA Consortium (1994).
M. Goker, T. Roth-Berghofer, R. Bergman, T. Pantleon, R. Traphoner, S. Wess, and W. Wilke, "The development of HOMER: A case-based CAD/CAM help-desk support tool" in: P. Cunningham, B. Smyth, and M. Keane, editors, Proceedings of the Fourth European Workshop on Case-Based Reasoning, pp. 346-357, Springer Verlag, Berlin, Germany (1998).

(Continued)

*Primary Examiner* — Jeffrey A Gaffin
*Assistant Examiner* — Ola Olude Afolabi

(57) ABSTRACT

A method and system are presented that simplify acquisition of cases for an incremental Case-Based Reasoning system. Case acquisition closely follows the normal problem-solving process and cases are automatically created in a form suitable for the CBR runtime. The method and system rely on the fact that the CBR runtime is already capable of taking the input data and constructing a case in a form that corresponds to the library cases. The problem-solving mode is transformed into the case-acquisition mode by replacing the 'choose next action' step in the incremental CBR algorithm by a step that generates a set of all applicable actions given the current content of the session case and the model. From these the user can choose an action that corresponds to an action from the real-world case description. This is repeated as part of the incremental CBR loop until a full case has been acquired.

16 Claims, 11 Drawing Sheets

(56) References Cited

OTHER PUBLICATIONS

R. Bergman, and M. Schaaf, "Structural Case-Based Reasoning and Ontology-Based Knowledge Management: A Perfect Match?", in: Journal of Universal Computer Science, vol. 9, No. 7, pp. 608-626 (2003).

C. Yang, R. Orchard, B. Farley, and M. Zaluski, "Automated Case Base Creation and Management", in: Proceedings of International Conference on Industrial & Engineering Applications of Artificial Intelligence & Expert Systems (IEA/AIE-2003), Loughborough, UK. Jun. 22-26, 2003. NRC 45812 (2003).

R. Bergman, J. Kolodner, and E. Plaza, "Representation in case-based reasoning", in: The Knowledge Engineering Review, 20, 3 (Sep. 2005), pp. 209-213, Cambridge University Press, United Kingdom.

ISoft, ReCall product information, http://www.alice-soft.com/html/prod_recall.htm.

* cited by examiner

CASE ACQUISITION FOR INCREMENTAL CASE-BASED REASONING SYSTEM

CROSS REFERENCE TO RELATED APPLICATIONS

This is a division of U.S. patent application Ser. No. 12/313,920, filed Nov. 26, 2008, now abandoned, which claims priority to U.S. Provisional Patent Application No. 61/012,815, filed Dec. 11, 2007, which is hereby incorporated by reference in its entirety.

FIELD OF THE INVENTION

The present invention relates to acquisition of new cases for incremental Case-Based Reasoning systems.

STATEMENT REGARDING FEDERALLY SPONSORED RESEARCH OR DEVELOPMENT

Not Applicable.

BACKGROUND OF THE INVENTION

Case-Based Reasoning (CBR) is a methodology for problem solving by reusing problem solutions that worked in the past. At the core of a CBR system there is a collection of previously solved problems called cases. Each case typically consists of a problem description and a verified solution to that problem. Given a new problem to be solved, a CBR system uses the most similar previously solved cases to derive a solution that applies to that new problem (see e.g., Aamodt & Plaza, Case-Based Reasoning: Foundational Issues, Methodological Variations, and System Approaches, 1994; also see U.S. Pat. No. 5,581,664 regarding a particular type of a Case-Based Reasoning system).

One of the main advantages claimed by CBR is its ability to learn how to solve new problems based on how similar problems were solved in the past. CBR claims to reduce the knowledge acquisition bottleneck compared to, for example, rule-based systems. Most of the knowledge acquisition effort for CBR consists of acquiring new cases. Because new cases can generally be acquired independently from one another this allows CBR to scale better compared to other problem solving methodologies.

Case Representation in CBR Systems

Cases in a CBR system may be represented and structured in diverse ways. A variety of knowledge representation formalisms have been used to represent case content in a way that lends itself to reasoning purposes. Three most common types of case representation are: feature vector cases, structured cases, and textual cases (see e.g., Bergmann et al, Representation in case-based reasoning, 2005).

Feature vector approaches represent cases as vectors of attribute-value pairs. Vector attributes usually have value types assigned to them but there are no explicit relationships between the individual attributes (though there may be some implicit relationships present, e.g., hard-coded in the logic of a CBR system). Cases represented as feature vectors are usually easy to acquire. Generally, it is trivial to design a user interface (UI) for acquiring such cases as the UI may be no more complicated than a simple data-entry form. Moreover, acquisition of such cases can frequently be successfully automated (e.g., Yang et al., Automated Case Base Creation and Management, 2003), so that little human intervention is necessary.

Structured cases are capable of representing relationships. The typical relationships are the binary is-a, has-a, and part-of relationships, but available formalisms can generally express arbitrary n-ary relationships. The two most common types of formalisms for representing structured cases are: frame-based formalisms, originating in Artificial Intelligence (AI), and object-oriented formalisms, originating in Software Engineering (e.g., Michael Manago et al., CASUEL: A Common Case Representation Language, 1994; U.S. Pat. No. 6,081,798). Recently, description-logics and RDF-derived formalisms are becoming more common. The process of case acquisition for structured cases can be quite expensive as construction of structured cases may require a lot of work, the effort increasing disproportionately as the size of individual cases grows and the number of relationships increases.

Text-based formalisms represent each case as one or more text fields. The benefit of this approach is that case acquisition can be relatively inexpensive—cases can readily be constructed if existing solved problem descriptions are in form of documents, notes, reports, etc. The simplicity of the case representation is offset by the need for more complex case retrieval algorithms.

It is useful to think about details of a particular case representation as being formalized by some model. (A model may be used in a CBR system for more than just formalizing the case representation, e.g., it can be used in case retrieval or in case adaptation. A CBR system designer may also choose to represent in a model other, non-problem solving, aspects of a CBR system, e.g., user skills, dialog constraints, etc. In the following, we focus only on the case-related aspects of the model.)

For feature vector representations, the model formalizing case structure can be very trivial—it may comprise no more than value types of the features (attributes) and possibly their range restrictions.

Structured case representations, on the other hand, may potentially have very complex underlying models. An example of a complex model would be an ontology of domain concepts and their relationships with additional constraints specified using some logic formalism (e.g., Bergmann & Schaaf, Structural Case-Based Reasoning and Ontology-Based Knowledge Management: A Perfect Match?, 2003). Cases are then instantiations of concepts from such a model.

Text-based case representations generally have little if any need for modeling a case itself—a model might contain simply the names and descriptions of the few text fields in the case. The complexity of such a system will be in the case-retrieval process which frequently benefits from using a (domain) language model.

As we have seen, models can vary in complexity. One aspect of that complexity is how many relationships between entities in the model are made explicit. With regard to this, models may be distinguished into shallow models vs. deep models. This is a gradual distinction—the deeper the model, the more relationships between the entities in the model are made explicit. The shallow vs. deep model distinction applies to all types of knowledge-based systems, not only to CBR.

Accordingly, feature vector and text-based case representations will have a shallow underlying model, while structured case representations may have a very deep underlying model.

Incremental vs. Standard CBR

CBR systems can be categorized into incremental CBR systems and standard CBR systems. In a standard CBR system, all information about the problem to be solved is collected up-front and this full problem description is presented to the CBR system, which then searches for a suitable solution, generally, without requesting any further information beyond what was already provided.

An incremental CBR system (e.g., Cunningham & Smyth, A Comparison of Model-Based and Incremental Case-Based Approaches to Electronic Fault Diagnosis, 1994; U.S. Pat. No. 5,717,835), on the other hand, begins with only limited information about the problem. As it matches that information against the collection of solved cases, it identifies new pieces of information that might be useful to know to help solve the problem. That information is then requested from the user, user's answer is stored in a temporary case (hence forth called a session case), and the next incremental CBR cycle commences. (Some incremental CBR systems, in addition to asking simple questions, may launch more complex information acquisition actions. These actions may combine several related questions, may contain a query or queries to an external system, etc.) Eventually, the incremental CBR system may obtain all information it needs to solve the problem.

The major benefit of an incremental CBR system is that it generally needs to obtain significantly fewer pieces of information to solve a problem. This benefit is of special importance in situations where information is obtained from a human user by asking questions, as opposed to getting the information more seamlessly, e.g., by reading sensor values; or if there is a high cost associated with acquiring each piece of information, e.g., if the user has to performs some lengthy test to determine the answer.

Incremental CBR works particularly well in domains where a problem and its context may potentially be described by a large number of variables, while in practice only a small subset of them may be relevant to solving a specific problem. An example of such a domain is troubleshooting.

Case Acquisition in CBR Systems

Case acquisition is the main mode of knowledge acquisition in the CBR systems. There are also other ways knowledge represented in a CBR system can be expanded, like acquisition of similarity knowledge, or expansion of the model. We are not addressing acquisition of these other types of knowledge and concentrate on just the case acquisition (assuming, for the most part, a fixed model).

As has already been mentioned, acquisition of new feature-vector or text-based cases is relatively easy. Same is also generally true for structured cases with a very shallow model. Most of the effort is in collecting information about solved problems and once that is available the new cases can be relatively easily entered into a CBR system. Sometimes, a specific case representation is chosen to facilitate case acquisition (e.g. U.S. Pat. No. 5,717,835).

Situation is more difficult for structured cases with complex (deep) underlying model. One way to build such cases is by manually instantiating and asserting every piece of information that represents the case structure using the same or similar tools as for building the model. A typical model editing tool will provide means for creating concept instances and editing them in addition to providing means for modeling concepts (classes). This can be done via a graphic UI, like e.g., in ReCall CBR software by ISoft. This, in general, is a very laborious process that, moreover, requires thorough understanding of the model and how it is used during the runtime, thus the expertise level required from whoever enters the cases this way is quite high.

For incremental CBR systems, an alternative way to acquire new cases is to try to rely on the functionality of the problem-solving CBR runtime system. Instead of using the CBR runtime system to solve a new unknown case, it is used to replay a case for which both the solution, as well as the problem-solving steps, are already known. At each problem-solving step, choices (regarding both the information acquisition actions to be launched and the answers provided) are made that match the choices made while the real-world problem case was being solved.

This case-driven method of case acquisition presupposes two things:
(1) First, that the incremental problem-solver UI allows for selecting from several possible information acquisition actions at each CBR step. Indeed, many incremental CBR tools enable this by presenting a ranked list of questions from which the user can choose one to answer.
(2) Second, because the suggestions for information acquisition actions are based on the best-matching cases, this method presupposes that the available collection of cases (the case library) is sufficiently large and/or varied so that it can be used to generate useful suggestions.

Because of the latter, this method has obvious problems when one tries to acquire novel cases, i.e., cases which are not a close variation of the already stored cases. This makes this method especially unsuitable to bootstrapping the system, when every entered case is a novel case.

As an example that illustrates this deficiency of the purely case-driven acquisition, let us consider a CBR system for troubleshooting Internet connections. (The examples provided here depict troubleshooting scenarios that may be encountered when dealing with technical support issues related to Internet service or cable TV service. However, such scenarios are for illustration purposes only; the systems and methods described herein can be used in connection with other scenarios.)

Suppose that all known cases stored in the system that are relevant to the problem of not being able to receive e-mail contain only "Reset-the-Modem" action. Assume now a real-world problem case where given same or very similar symptoms an observation was first performed whether a particular web page was viewable. If we try to create a representation of this new case using the method described above we will never be given an option to choose "Check-WebSite-Viewable" action if none of the library cases has it. Instead we will be presented only with a choice of "Reset-the-Modem", which is not the one that we are looking for, even though it might be defined in the underlying model.

Some incremental CBR tools try to combine the two ways of entering the cases, namely case-driven acquisition (using normal problem-solving mode) and manual case entry using a model editing tool. An example of this is the CBR tool used in the HOMER system (e.g., Goker et al., The development of HOMER: A case-based CAD/CAM help-desk support tool, 1998). It allows for case acquisition based on previous cases using its problem-solving mode, but expert users can override this by entering data directly on case instances. Thus, it avoids some limitations of the case-driven method by allowing an expert to directly enter data that might not be suggested by existing cases. It also avoids some limitations of the direct case-entry using a model editing tool, mainly by reducing the frequency of when it is needed. However, a significant limitation of the HOMER system still remains that unless the new cases being entered are like the existing cases, an expert user is required to enter the cases by directly editing their structure and content, which is expensive. This occurs frequently enough, e.g., when bootstrapping the system with cases or when expanding the system to cover new types of problems, to have a significant negative impact on the cost of using and maintaining a CBR system like this.

Thus, we see that with today's methods and systems acquiring new cases in an incremental CBR system that has complex-structured cases requires significant effort and know-how, especially in situations where the cases being entered are novel. In entering these cases one cannot rely on the "help" of already entered cases, and entering these manually using a model editing tool requires high expertise and is time consuming. This makes building and maintaining such systems both difficult and costly.

Given these rather significant limitations, better tools for acquiring new cases are needed:
(a) Tools that do not require entering cases at the model level, while still retaining the flexibility to enter novel cases, dissimilar to cases already stored in the system.
(b) Tools that allow for acquiring structured, deep-model cases by persons not necessarily having expert knowledge of the model used by a particular CBR system, without having to resort to manual manipulation of the case structure—the tool itself should be responsible for creating correct internal representations according to the model.
(c) Ideally, these tools should support easy case acquisition based on case descriptions that are in a form easily understood by persons authoring the cases.
(d) For many incremental CBR systems, these case descriptions might be in a form of a (transcript of a) dialog, i.e., a series of questions and answers, that illustrates how a particular problem was solved in practice. A case-entry tool should allow the user to enter the case in a manner most similar to the dialog.
(e) In order to avoid the bootstrapping problem, as well as to allow entering of significantly novel cases, the tool should not be exclusively case-driven. The tool should use a session case plus the model, rather than a session case plus only the already-known cases, to generate a list of applicable information acquisition actions from which the user could pick these that match the real-world problem case the best.
(f) The tool and the underlying method and system, should ideally impose no restrictions on the model used. (Some prior art achieves most of the goals stated above by imposing a particular type of model, see e.g. U.S. Pat. No. 5,717,835.)

One particular application area for such a case-entry tool is constructing cases based on transcripts of phone calls to a customer-support center. An ideal tool would allow one to follow the call transcript and select, in the tool UI, questions and answers matching those occurring in the transcript.

BRIEF SUMMARY OF THE INVENTION

The method and system described herein allows for efficient acquisition of cases for an incremental Case-Based Reasoning system, in particular where cases are structured and have an underlying deep model. The method and system builds on top of a CBR runtime system that is capable of solving problems using existing library cases. The method and system modifies the step where CBR runtime system in problem-solving mode would generate the most useful information acquisition action (or a set of these) based on analysis of the session case with respect to retrieved best matching cases from the case library. Instead, in the case-acquisition mode, all currently relevant information acquisition actions are generated based on the analysis of the current content of the session case with respect to its model.

Thus the method and system adds features necessary to acquire any case allowed within the scope of the model without the need to manually edit that case. Manual case entry is replaced by a process similar, from the user's point of view, to normal problem-solving.

For the purpose of the description herein, by model we understand any formalization (accessible to a computer-executable algorithm) of the potential case structure and content. The system and method are applicable no matter how simple or complex the model is. In the description we also refer to information acquisition actions which denote any actions by means of which a CBR system may acquire information that it requires. These actions may include: simple questions, groups of related questions, queries to external systems, etc.

BRIEF DESCRIPTION OF THE DRAWINGS

The accompanying drawings, wherein like referenced numerals are employed to designate like parts or steps, are included to provide further understanding of the invention and are incorporated in and constitute a part of this specification, illustrate embodiments of the invention and, together with the description, serve to explain the principles of the invention.

In the drawings.

DETAILED DESCRIPTION OF THE PREFERRED EMBODIMENTS

It is to be understood that both the foregoing general description and the following detailed description are exemplary and explanatory and are intended to provide further explanation of the invention as claimed.

Problem Solving vs. Case Acquisition

In the following, a distinction is made between problem-solving mode and case-acquisition mode of a CBR system. In the problem-solving mode CBR runtime uses cases from the case library to try to solve new problems. In the case-acquisition mode, CBR runtime interacts with the user regarding already solved real-world cases with the purpose of constructing corresponding cases to be stored in the case library.

Although working of the CBR runtime in the problem-solving mode is not the subject of the method and system of this invention, some details of the problem-solving mode are provided before describing the case-acquisition mode. It will highlight how the problem-solving mode differs from the case-acquisition mode, and will introduce some CBR runtime mechanisms that will be used by the system and method.

Figure 1A:
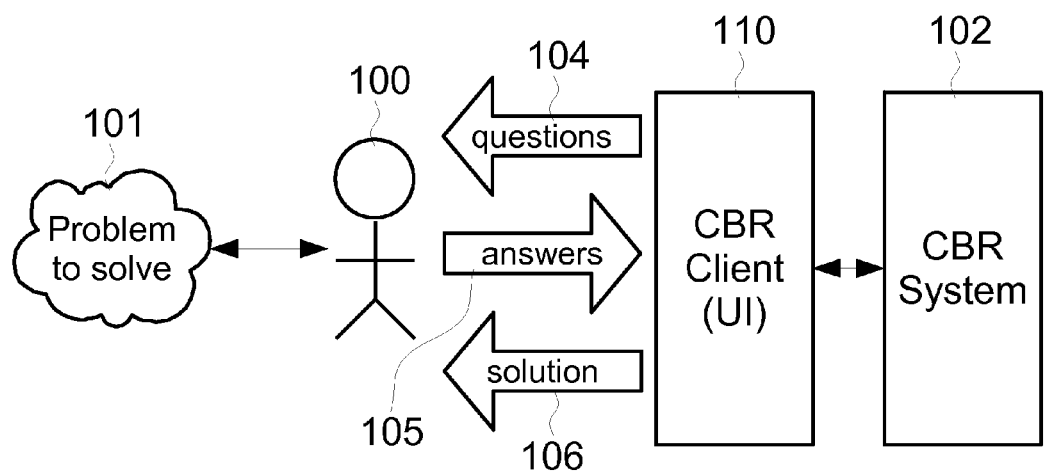
FIG. 1A depicts the problem-solving mode of working with a CBR system.

FIG. 1A shows schematically how a user 100 interacts with a CBR system 102 in a problem-solving mode. Given a problem 101 to be solved, the user 100 interacts with the CBR system 102 via a CBR UI 110 with a goal of finding a solution 106 for the problem 101. The interaction consists of a series of questions 104 asked by CBR system 102, presented via the UI 110, about the problem 101.

The user 100 provides the answers 105 also via the UI 110. CBR system 102 processes these answers, asks follow-up questions 104, and eventually delivers a solution 106, i.e., if such a solution could be found. Note that FIG. 1A presents just a general representation of problem-solving using a CBR system. The UI 110 may have different forms, e.g., it may be a graphic UI (GUI) or a voice UI (VUI). In certain manifestations and/or situations CBR system 102 may interact with the problem 101 without the mediation of a user 100, e.g., if the problem involved a computer, some properties of that computer could be inspected in an automated way without asking user 100 a question.

Figure 1B:
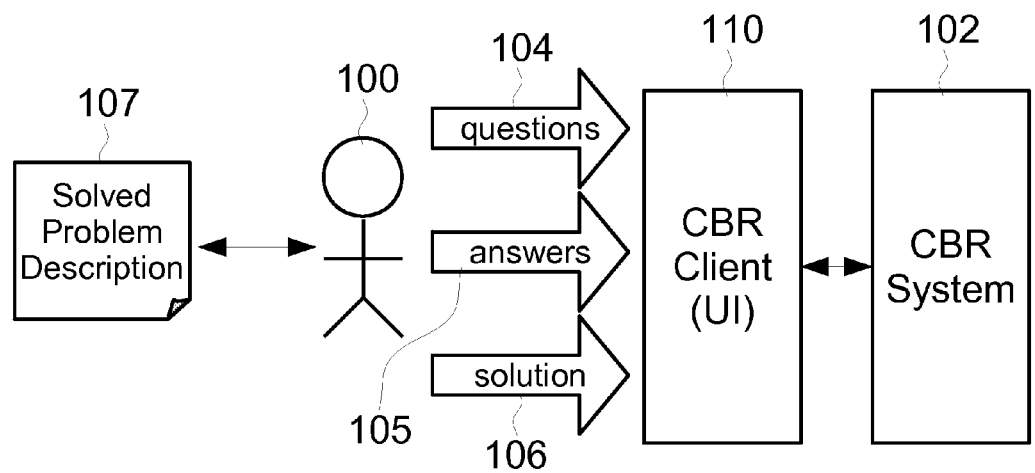
FIG. 1B depicts the case-acquisition mode of working with a CBR system.

In case-acquisition mode, which is the learning mode for the CBR system 102, depicted in FIG. 1B, the goal of the user 100 (who may be a person different from the user 100 in FIG. 1A) is to provide the CBR system 102 with information about how a particular problem has been solved. The user 100 has a description 107 of an already solved problem (a real-world problem case). The description 107 might be, e.g., a transcript of a troubleshooting call to a customer support line for some product or service, but generally the form of the description is not of importance to the method and system. Via UI 110, the user 100 chooses the questions 104 that CBR system 102 should ask in order to solve the same or a similar problem. Of course, the corresponding answers 105 are also provided, as well as the final solution 106. CBR system 102 stores all this acquired information internally. Note that depiction in FIG. 1B is simplified to make comparison to FIG. 1A obvious, in particular, questions 104 in FIG. 1B that the user 100 chooses correspond in general to any information acquisition actions.

As FIGS. 1A and 1B show, there are many similarities between the problem-solving and case-acquisition modes. The major difference is that while in the problem-solving mode it is the CBR system 102 that chooses the questions 104, in the case-acquisition mode it is the user 100 who chooses the questions 104.

CBR System Details

Generally, a CBR system contains a collection (library) of solved cases; some representation of the current problem being solved (a session case); some model (varying in detail and complexity) formalizing the case structure and the problem solving knowledge; implementations of select CBR algorithms, like e.g. similarity matching, ranking, etc.; means for data input and output; and so on. These components and functionalities can be combined and distributed in a variety of ways to achieve desired system behavior. In the description provided herein, one specific embodiment of a CBR system is presented, however, the systems and methods apply to other embodiments.

Figure 2:
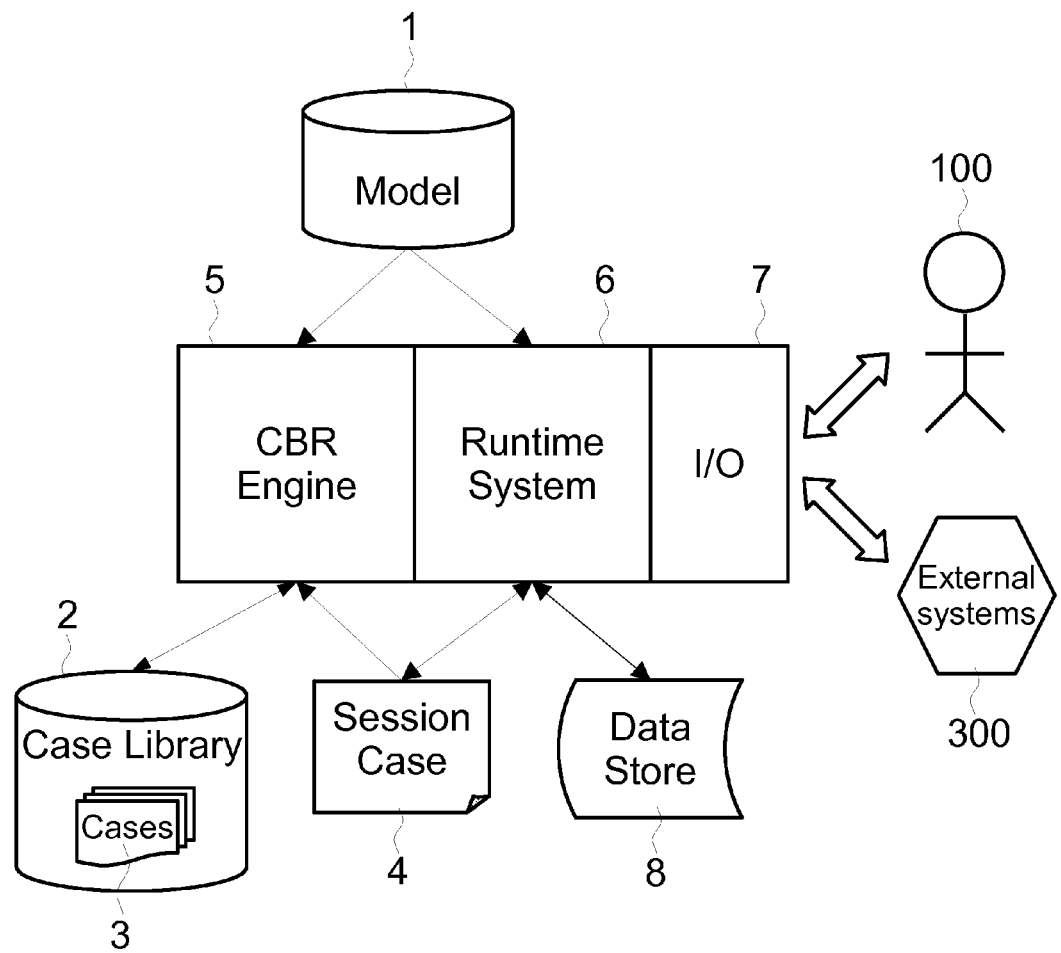
FIG. 2 depicts the components of an example manifestation of a CBR system.

In FIG. 2 the components of one possible manifestation of a CBR system are shown. A model 1 describes relevant details of the concepts from the problem domain potentially including their inter-relationships. Depending on the specific manifestation, the complexity of the model 1 will vary. A case library 2 contains representations of previously solved cases 3. (Potentially, case library 2 may also store unsolved cases, for example, cases for which solutions cannot be reliably determined using automated methods.) The cases 3 in the case library 2 are called library cases. They are represented in terms defined by the model 1.

A session case 4, which, conceptually, represents all information acquired so far about the problem being solved, is in this manifestation represented in a way analogous to the library cases 3. This way of representing a session case 4 has a benefit of simplifying implementation of the retrieve or retain steps of the CBR cycle (e.g, Aamodt & Plaza, Case-Based Reasoning: Foundational Issues, Methodological Variations, and System Approaches, 1994). Some other manifestations might represent session case 4 data in a manner dissimilar from cases 3 in the case library 2. This system and method described herein applies also to such manifestations as long as the session case 4 reflects concepts and relationships as defined in the model 1 and there is a transformation available which will convert a session case 4 to a library case 3.

A CBR engine 5 is responsible, among other things, for matching session case 4 to cases 3 from case library 2, ranking them, running CBR algorithms, and so on. A runtime system 6 controls the information acquisition processes. It can initiate information acquisition based on output from CBR engine 5, based on the model 1 constraints, or based on some predefined set of steps (a logic flow). The predefined flow-logic definitions as well as other data needed by runtime system 6 are stored in data store 8. Runtime system 6 communicates with the user 100 and/or other (external) systems 300 via I/O (input/output) sub-system 7. Runtime 6 takes the acquired (incoming) information and represents it in a required form in the session case 4.

Figure 3:
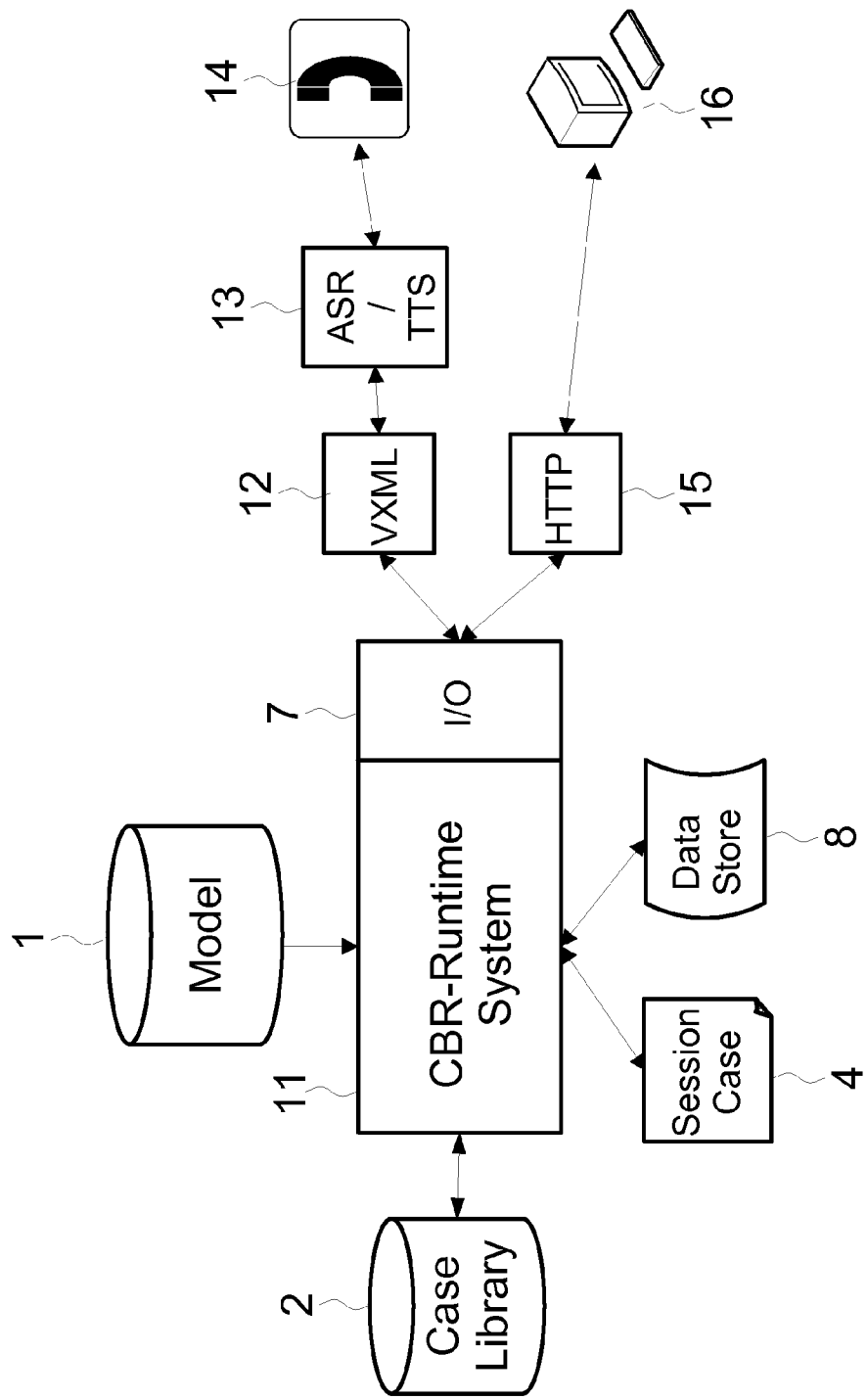
FIG. 3 depicts components of an example manifestation of an incremental CBR system that can communicate using speech or/and using text/graphic interface.

FIG. 3 shows another view of a possible manifestation of a CBR system 102, this time highlighting some of the many possible means of communication with the user of the system. For simplicity we group CBR engine 5 and runtime system 6 into a single CBR runtime system 11. In this manifestation, communication with the user can happen via speech/voice (for example, using VXML interpreter 12, ASR/TTS engine 13, and phone 14), via GUI (for example, via web pages 15 accessible via a computer 16), or via both.

CBR-Runtime in Problem-Solving Mode

The typical runtime execution of an incremental CBR system engaged in problem-solving consists of cycles. These cycles include activities related to information acquisition, see FIG. 4. In each cycle, the CBR runtime 11 first acquires 21 all information specified as required in the model 1, and then performs incremental CBR reasoning 23 to decide 24 what next (optional according to the model 1) concept to acquire 25, which then triggers the next cycle. Sometimes, information about a concept cannot be acquired as a single answer to a single question—in such cases a flow of interaction (flow-driven acquisition 22) is launched where a user may be asked a sequence of several related questions. Model-driven 21 and/or flow-driven 22 acquisition may not always be present in specific embodiments.

As far as the type and content of the acquired information is concerned, CBR runtime 11 can perform the following three types of information acquisition:

Value acquisition—is the acquisition of some primitive value, like e.g., the digits of an account number.

Concept acquisition—consists of asking the user 100 (or querying an external system 300) about the concept (defined in the model 1) for which the system has no information available so far. An example question would be "What Operating System (OS) are you using?" if the CBR runtime 11 had no information whatsoever about what OS is used on the user's computer. Note, that in certain situations, the system does not have to ask the user and can create an instance of a concept directly. That would be the case if OS type could be derived (deduced) using the model 1 from other information (like brand and model of computer) already present in the session case 4.

Concept refinement—applicable if concepts in model 1 are organized in a (class) hierarchy. It is different from concept acquisition, and consists of asking details regarding specialization of a concept that the system acquired previously (and stored in session case 4). For example, a question might be asked "What type of Windows OS do you have?", if the user had already specified that Windows OS was running on the computer, but the CBR runtime 11 needed more specifics.

After acquiring or generating (e.g., deducing using model 1) each piece of information the CBR runtime 11 typically adds it to the session case 4, unless that information is transient, stored in data store 8 instead, or otherwise not needed to be stored in the session case 4. The method and system assumes that the CBR runtime 11 has the necessary algorithms to take every piece of information to be stored in the session case 4 and represent it in a form that conforms to the model 1. For feature-vector based representations this may be trivial. Where more complex model 1 underlies the case representation this will be more involved, e.g. CBR runtime 11 may represent newly acquired information using an instance or a set of instances of concepts provided by the model 1 and incorporate them into the session case 4 structure in a way that maintains all the required relationships between these instances as required by the model 1.

CBR Client in Problem-Solving Mode

The interaction between the runtime 6 and the user 100 can happen using different modalities. In the exemplary manifestation, the mode of communication normally used in the problem-solving mode is speech (e.g., via VXML-standard compliant interpreter 12) but the described manifestation can also communicate with the user via text (e.g., using a computer terminal 16), see FIG. 3. In the following description, concentration is made on the text mode of communication because it is used in the case-acquisition mode.

FIGS. 5 and 6 and FIGS. 9 to 11 show a (UI of) CBR Client Tool 200 that is a part of an example manifestation of the method and system. In the example manifestation this tool 200 is running on the computer terminal 16 shown in FIG. 3 and is one of the possible manifestations of CBR client 110. The tool 200 allows for text-based interaction with the CBR runtime 11. Note that presence of a CBR Client Tool 200 like in the example manifestation is not a crucial part of the method and system. Other manifestations might not even have a user interface at all, for example if they are designed for automatic case generation from machine readable problem case descriptions—in such case communicating with the CBR runtime 11 could be direct via some system interface.

Figure 5:
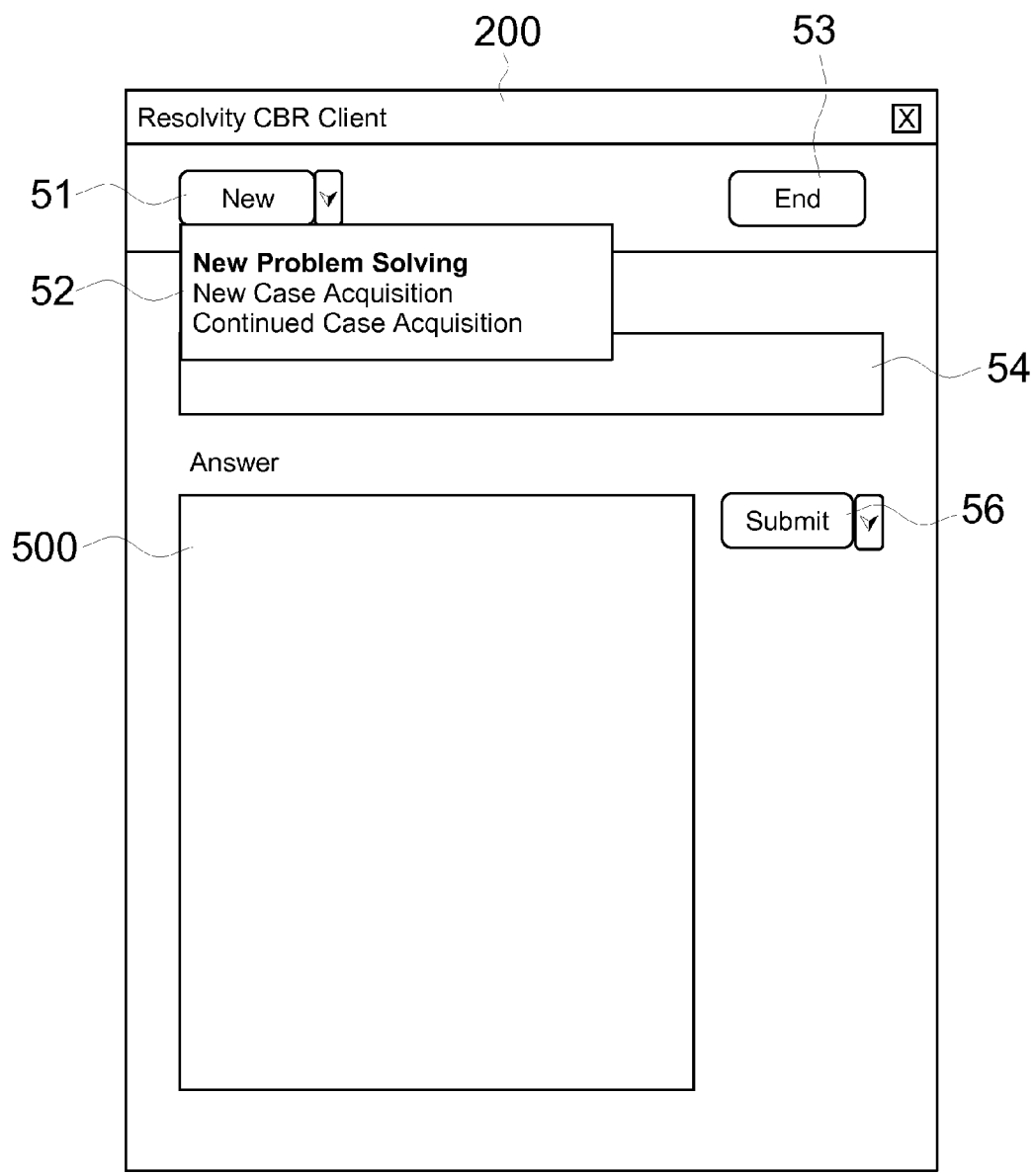
FIG. 5 depicts a text-based CBR Client Tool of our example manifestation with the New Session Type menu open.

The main elements of the CBR Client Tool 200 GUI as shown in FIG. 5 are: a New Button 51 that opens New Session Menu 52; the End Button 53 closing the application; the Prompt Window 54, which shows a prompt or a question communicated to the user; the Answer Window 500 shows available answers that the user may submit in response to a prompt; and Submit Button 56, which can be used to modify the submitted answer.

Options in the New Session Menu 52 show that the CBR Client Tool 200 can start a session with the CBR runtime 11 either in the problem-solving or in the case-acquisition mode (in the case-acquisition mode we can either start building a new case or complete an unfinished case). Starting a new session creates a new empty session case 4.

Figure 6:
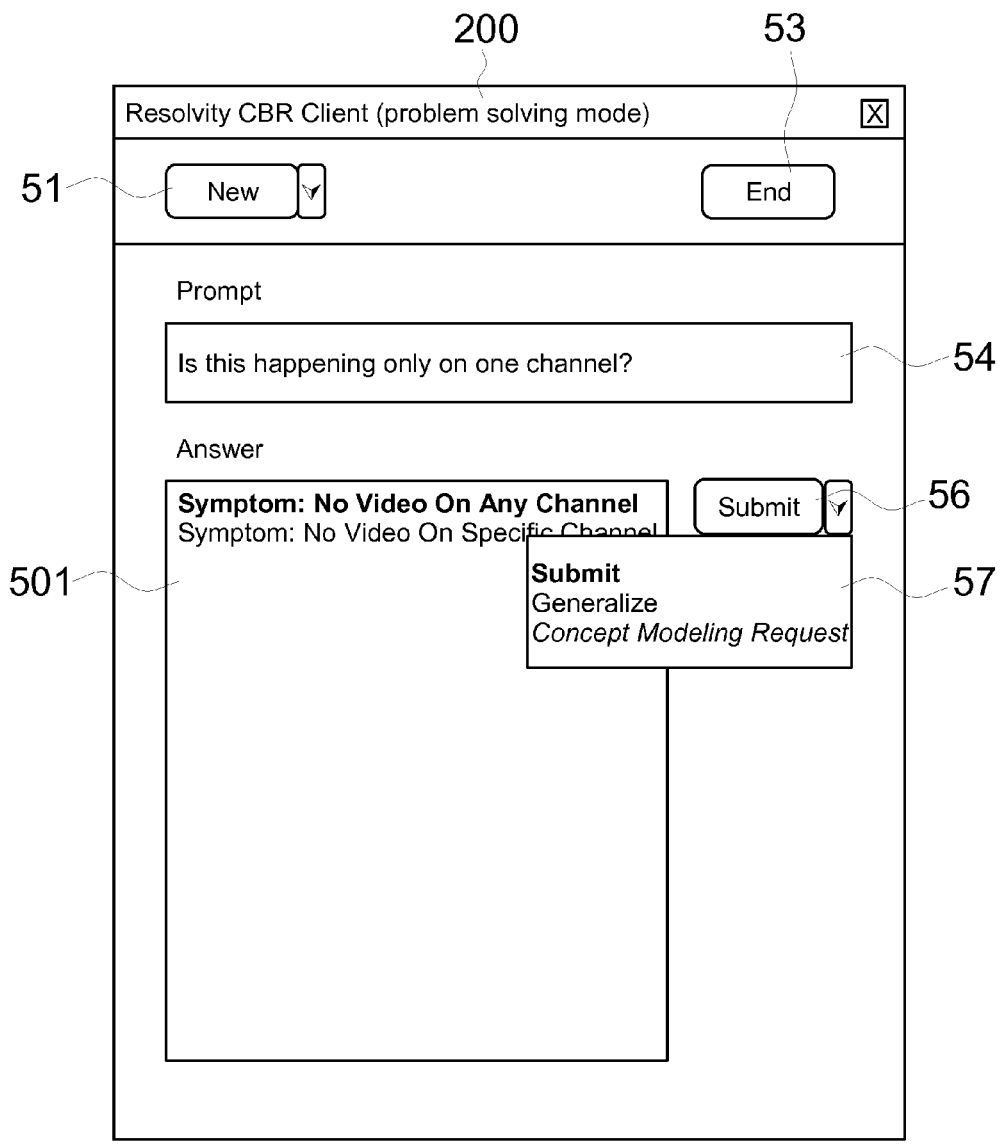
FIG. 6 depicts the CBR Client Tool of our example manifestation in problem-solving mode while submitting an answer to a question.

FIG. 6 shows an example of the client tool 200 use in problem-solving mode. The CBR runtime 11 needs user to answer a question (which the client tool 200 shows in Prompt Window 54) and presents several concepts to choose from 501. User 100 has to choose a concept and submit it using the Submit Menu 57. The particular question that is being asked has been chosen by the CBR runtime 11 as the most useful question given all the information acquired from the user so far. In other manifestations, the CBR Client Tool 200 can present more than one question in 54, letting the user choose which one to answer; however, this particular manifestation closely mimics the interaction flow as it would occur if the interaction medium was speech, therefore there in only one question.

A full problem-solving session in the example manifestation will consist of a long sequence of such questions and answers. The information acquired this way will be stored in a suitable form in the session case 4. The interaction ends either when the problem is successfully solved or when the CBR runtime 11 can offer no more suggestions. At the end of interaction, the session case 4 in the CBR runtime 6 is structurally a well-formed case, just like the cases 3 from the case library 2. If the problem is solved, then the session case 4 can be added to the case library 2 if desired.

However, in line with what was already discussed, the problem-solving mode of operation is generally not suitable for case acquisition. This is further accentuated in this particular manifestation of CBR Client Tool 200, because the system is conducting a straight dialog with the user, always launching a single information acquisition action, thus it is the system that decides, via incremental CBR algorithm 23, which information to acquire. The user has no direct control over what questions are asked in the problem-solving mode.

As already mentioned, an alternate manifestation of the CBR Client Tool 200 presents multiple information acquisition actions for the user to choose from. Although more flexible, it is still not flexible enough for case-acquisition in the normal problem-solving mode, because the information acquisition actions are limited by the cases 3 already present in the case library 2.

Case-Acquisition Mode

The system and method of this invention add a special case-acquisition mode to the CBR runtime system 11 and the CBR Client Tool 200.

Figure 4:
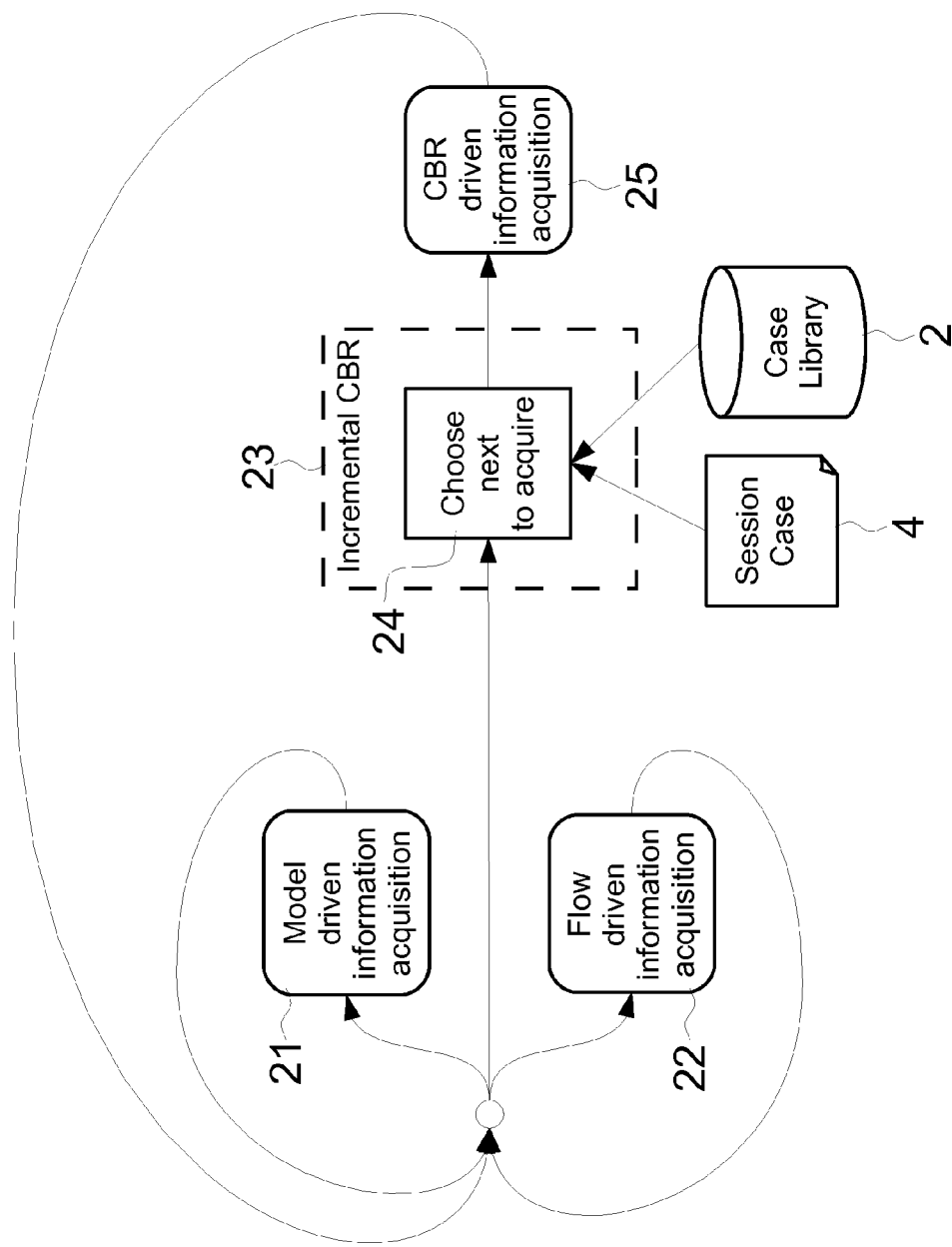
FIG. 4 depicts an outline of the information acquisition processes in an incremental CBR system running in the problem-solving mode.
Figure 7:
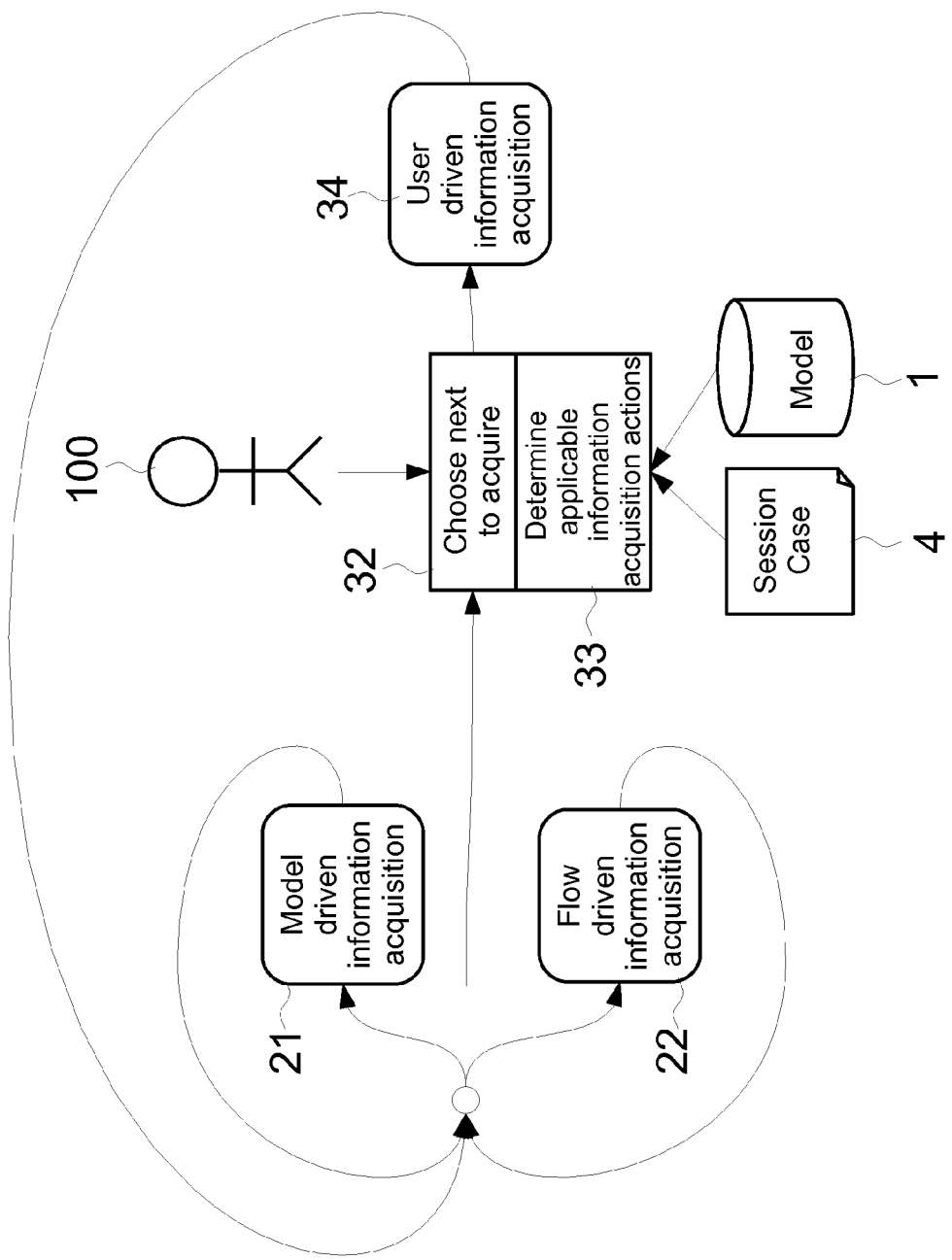
FIG. 7 depicts an outline of the information acquisition processes in an incremental CBR system running in the case-acquisition mode (compare with FIG. 4).

The difference between the new case-acquisition process and the already described problem-solving process is illustrated in FIG. 7 as opposed to FIG. 4. FIG. 4 shows the problem-solving process; in particular, how CBR-driven concept acquisition 25 relies on the incremental CBR 23 suggestions made after analyzing the cases from the case library 2 that best match the session case 4. FIG. 7 shows that a new type of "Choose Next To Acquire" 32 step is introduced—one that is model-driven and user-controlled, rather then being entirely under control of incremental CBR 23 as step 24 in FIG. 4 is, thereby resulting in a new case-acquisition mode.

Both model-driven and user-controlled aspects are important to the system and method described herein. It is desired to give the user more control over cases that are entered so that it is possible to enter novel cases. But, on the other hand, especially when the case structure and the underlying model 1 are complex, it is desired to shield the user 100 from the potentially daunting task of having to understand the intricacies of the model and having to enter cases using a model editing tool—which although providing highest level of control over cases, requires also highest expertise. That is why the determination of the set of information acquisition choices is model-driven (as determined by process 33 in FIG. 7) in such a way that only a (smaller) set of choices which are meaningful given the current content of the session case 4 are presented for the user 100 to choose from. Moreover, once a choice is made by the user 100, the session case 4 is automatically updated by the CBR runtime 11 using the normal algorithms already present for the sake of the problem-solving mode. Thus the user 100 who enters new cases does not have to edit the details of the session case 4 at all—this greatly contributes to the goal of simplifying case acquisition.

The set of information acquisition actions from which the user 100 can choose in the "Choose Next To Acquire" step 32 are determined within "Determine applicable information acquisition actions" process 33 based both on the information already contained in the session case 4 and the model 1. The CBR runtime 11 determines these information acquisition actions in a process of evaluating the model 1 in the context of the information already stored in the session case 4. The information acquisition actions that have been identified this way are then presented to the user via CBR Client Tool 200 (see FIG. 9 window 502). User may choose one of them, which will then trigger actions like in the normal problem-solving cycle (FIG. 4) until the next decision has to be made. The acquired information will be represented within the session case 4 structure, therefore, eventually building a well-formed case ready for entry into the case library 2. Note, that in this process, from the user's point of view, only the "Choose Next to Acquire" step 32 is different from the normal problem-solving mode. Given that this step is a simple choice, and that all the other problem-solving type interactions were easy (assuming a well-designed UI), the overall task of new case-acquisition becomes accessible to non-expert users.

The process of "Determine applicable information acquisition actions" 33 from FIG. 7 can be implemented using a variety of methods known in prior art. For simple models this implementation can be trivial, like e.g., choosing a next empty feature if case is feature-vector based. (In practical embodiments for simple feature-vector cases the method and system reduces to trivial implementation and, although applicable, has little benefit over directly entering/editing new case.) More complex models will require more sophisticated algorithms.

For illustration purposes, it is considered as to how this process of "Determine applicable information acquisition actions" 33 is implemented in an example manifestation with a model 1 that has concept hierarchy, typed attributes, and value-type constraints. In a first step, the example algorithm identifies all attributes reachable from the root instance of the session case 4 that either have no value or whose values are instances of non-leaf concepts (i.e. are refinable). For each of these attributes the algorithm identifies the permissible types of values. This is done first of all using the attribute type information (for attributes that already have values the permissible types are limited to subclasses of the already present value). In a second step, the type of permissible values for each potential attribute can be further narrowed down by applying value-type constraints defined in the model 1. This narrowed down set of value types for all reachable attributes is then used to generate information acquisition actions. If an attribute already has a value, then a refinement action is generated. Note that if any of the attributes has only single permissible value then that value can be set automatically without having to present it to the user in the "Choose Next To Acquire" step 32.

Figure 9:
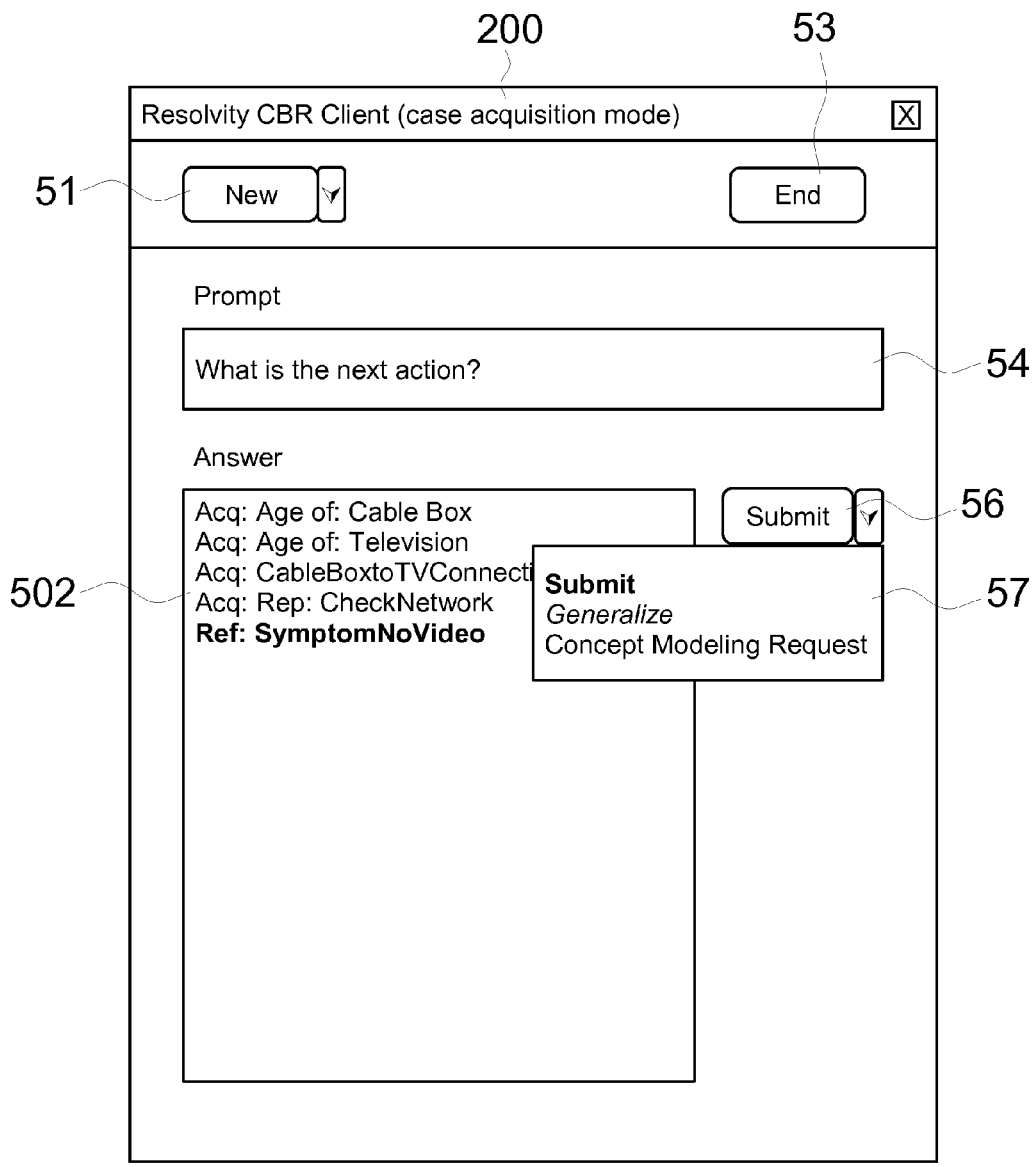
FIG. 9 depicts the CBR Client Tool of our example manifestation in case-acquisition mode while choosing next information acquisition action to perform from all currently applicable actions.

In FIG. 9 we see the CBR Client Tool 200 of the example manifestation running in the case-acquisition mode (with steps depicted in FIG. 7). The model-driven questions and the flow-driven questions are the same as in the problem-solving mode. But the CBR related interaction is different. In FIG. 9 we see a list of choices 502 that are specific to the case-acquisition only (Acq: stands for concept acquisition action and Ref: for concept refinement action). The CBR runtime 11 has reached a point where in the problem-solving mode it would have used the CBR engine 5 to decide what new concept to acquire or what existing concept to refine ("Choose Next To Acquire" step 24 in FIG. 4). In the case-acquisition mode, however, the CBR runtime 11 does not make that decision automatically. Instead, it determines, using an algorithm like the one described in paragraph above (33), the full set of concepts that could meaningfully be acquired or refined. The full set of candidate concepts is presented (32) to a user in a list shown in window 502. The user can then choose the concept to be acquired or refined that corresponds to the real-world solved case. Once either concept acquisition or refinement has been chosen, it triggers a corresponding information acquisition action (as in 34 FIG. 7) and subsequently possibly a sequence of non-CBR interactions (as in 21 and 22), until the next CBR acquisition/refinement decision has to be made.

To illustrate this further, suppose that a real-world solved case is available as a transcript of a technical support call. In the call a customer-support agent asked a question that tried to find out more about what the caller had already said about there being "no picture" (no video) on the screen. Now, to represent this aspect of a real case, in the CBR Client Tool 200, one would choose "Ref: SymptomNoVideo" (refinement of the 'SymptomNoVideo' concept) from the list of available information acquisition actions 502. Or suppose that in a real case a support agent asked a caller how the cable box was connected to the TV—we would have chosen for acquisition (Acq:) of a new concept 'CableBoxToTVConnection'. Or if a transcript told us that an agent launched a network check procedure, we would have chosen 'Acq: Rep: CheckNetwork' action. ('CheckNetwork' action is an example of a special type of concept acquisition because in the problem-solving mode the outcome (answer) would have come from querying an external system and not from the user/caller. In the case-acquisition mode that type of action has to obtain an outcome from an equivalent proxy for an external system where the answer is actually provided by the user performing case acquisition.)

In this way, using the case-acquisition mode, real-world solved problem cases, e.g., transcribed support calls, can relatively easily be converted into corresponding library cases 3 by matching the concepts from the real-world case descriptions to the choices in the CBR Client Tool 200.

Figure 8:
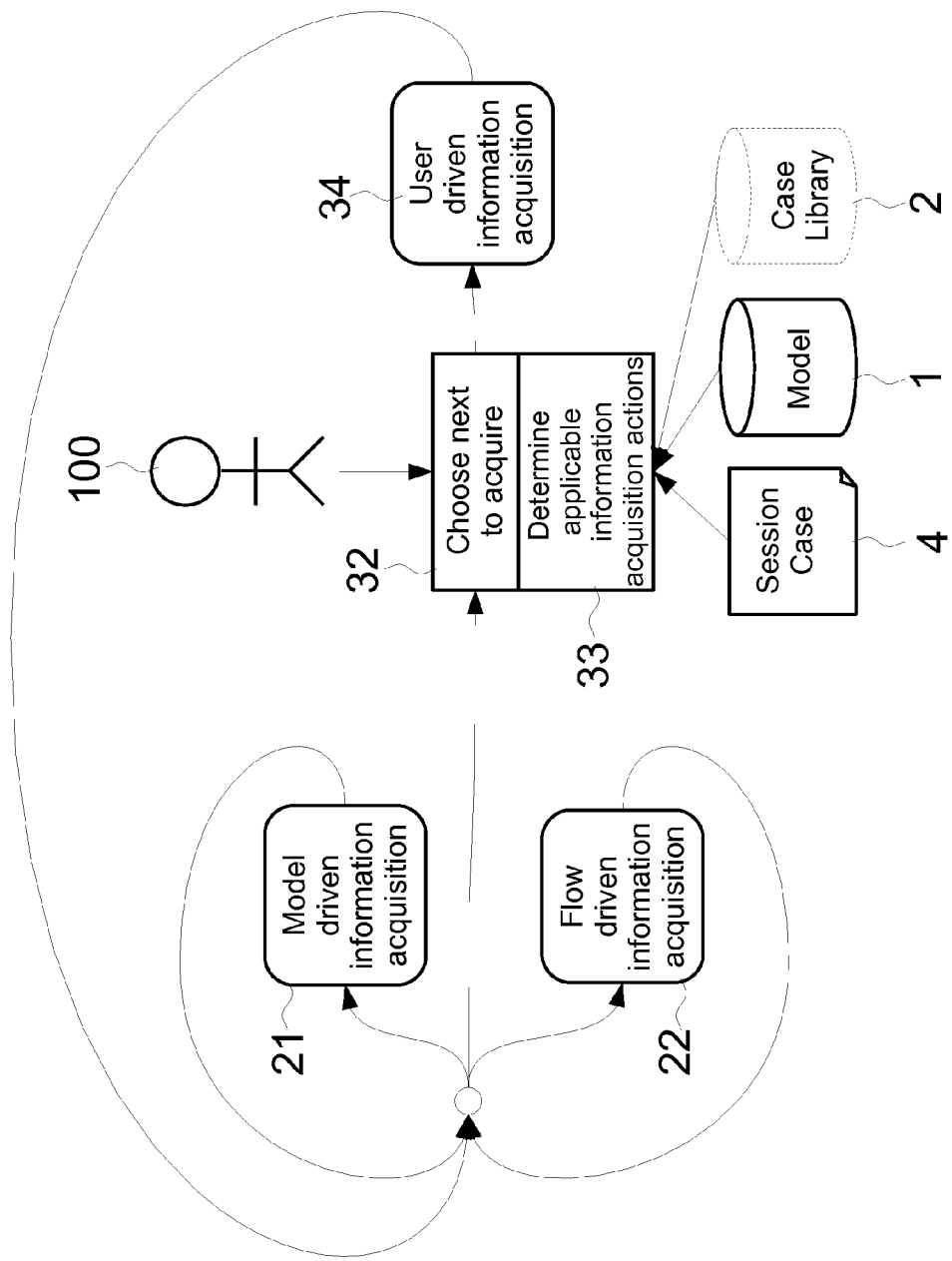
FIG. 8 depicts a variation of the system from FIG. 7 showing that in some embodiments case library may also be queried in order to determine applicable information acquisition actions.

In certain embodiments, the process to "Determine applicable information acquisition actions" 33 from FIG. 7 may make use of the case library 2 data in addition to the model 1—this is depicted in FIG. 8. One example where this would be useful is in systems where a portion of the case contains attributes with values that cannot be enumerated using the model 1. For instance, in hybrid structured/text-based cases, some information in a case might be in a form of unstructured text (e.g., questions and answers). These text-form questions cannot be determined based on the model 1, and instead library cases 3 have to (or can) be used to suggest them.

Other Aspects of the Case-Acquisition Method

Figure 10:
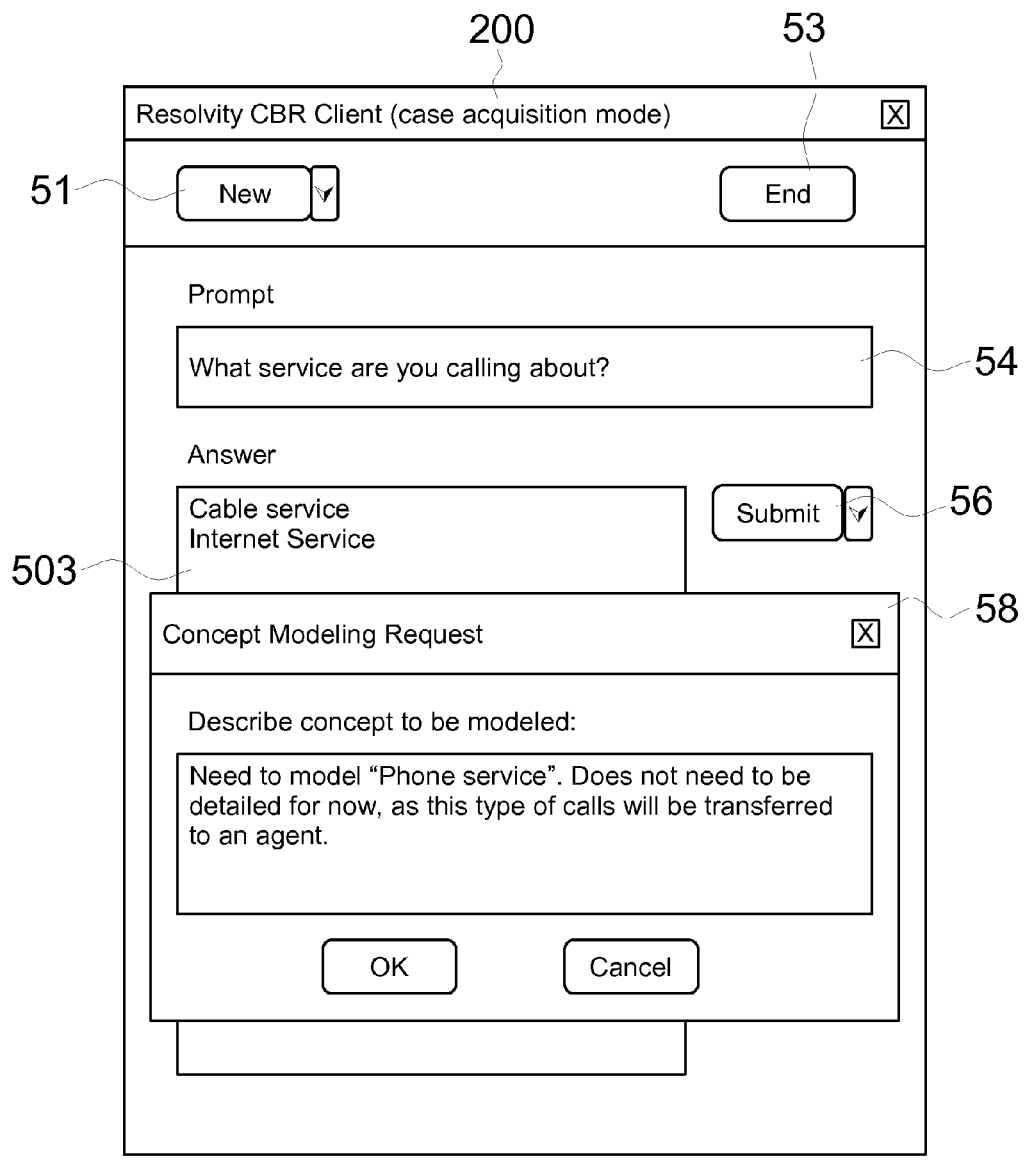
FIG. 10 depicts the CBR Client Tool of our example manifestation in case-acquisition mode while submitting a concept modeling request.
Figure 11:
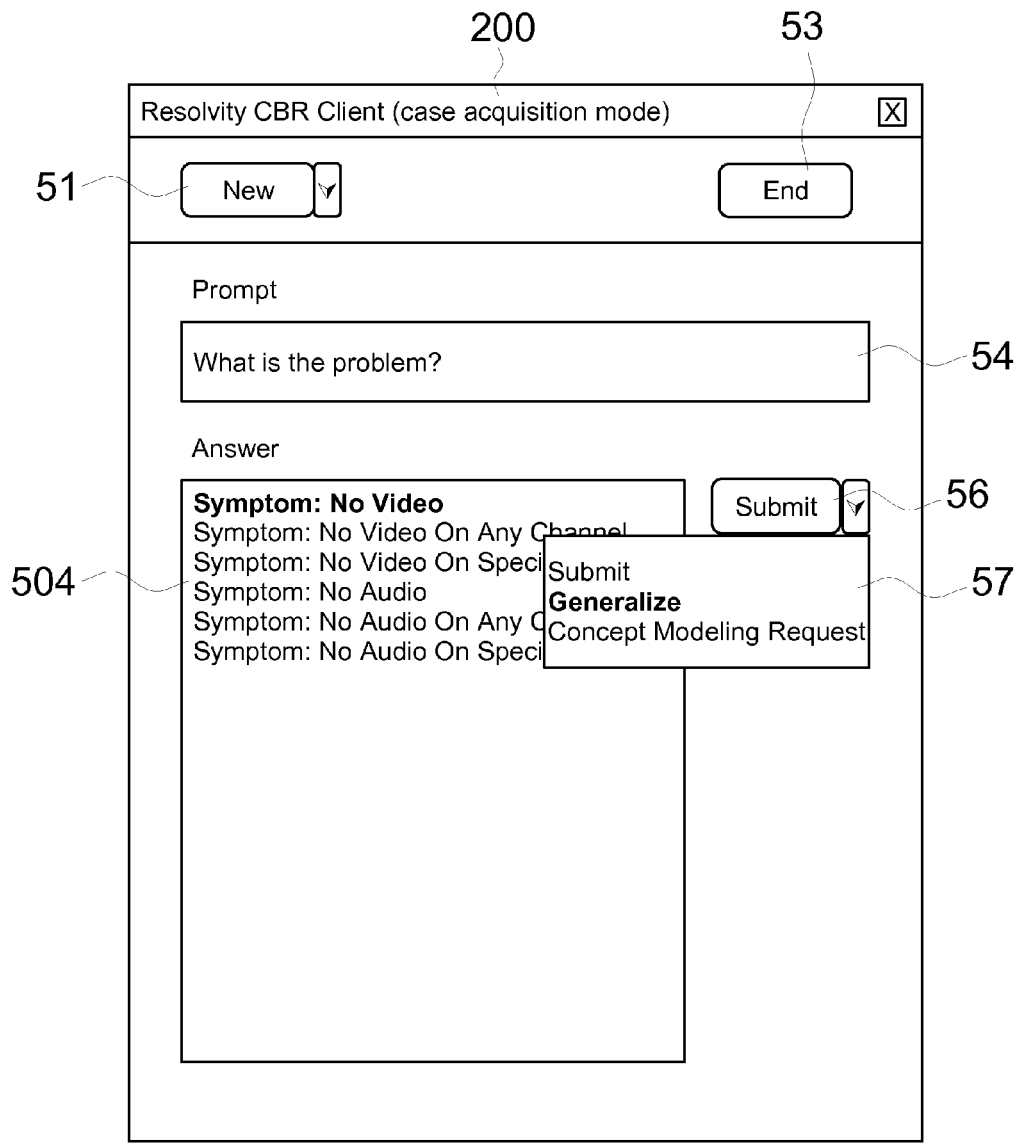
FIG. 11 depicts the CBR Client Tool of our example manifestation in case-acquisition mode while submitting a generalized answer.

Sometimes, a real-world problem case may refer to a concept that is not in the model 1 vocabulary, i.e., there is no model 1 concept defined that could represent the real-world concept. Continuing the example of cases from technical support calls, this problem would, e.g., occur if a real-world case description mentioned a type of service that has not been modeled yet. For instance, the model 1 might contain only Cable Service and Internet Service concepts (as shown in FIG. 10, 503), but not a Phone Service concept. In such a situation, the method and system allows for submission of a Concept Modeling Request. FIG. 10 shows a Concept Modeling Request Dialog 58 in the UI of the CBR Client Tool 200 of our example manifestation. The request, the real-world case-description, and the partially created case will be stored until a knowledge engineer models the requested concept (enters it into model 1). Afterwards, the creation of that particular case can be resumed.

The method and system is also capable of generalizing concepts directly during case acquisition. Continuing the example from the previous paragraph, let's assume that we have a situation where the same set of troubleshooting actions applies no matter whether there was no video on just one channel, or no video on all the channels. In this situation, we could generalize the case by selecting (in 504, FIG. 11) a general "NoVideo" concept instead of one of the specific ones, and choosing "Generalize" option from menu 57. As result, the instance of "NoVideo" concept will be marked as a "generalized" instance in the session case 4. Of course, submitting a generalized concept is correct only if the problem in the original problem-solving transcript can be generalized, i.e., it does not lose validity if all the references to the specific concept are replaced with references to a generalized concept. It is important to note that the correct case-acquisition procedure should not resort to generalizing concepts merely to circumvent the lack of specific concepts in the model 1. Generalization should be used where it makes sense from the knowledge-modeling perspective. Therefore, generalization may be deferred to after case acquisition. This way, library cases can be acquired as direct reflection of real-world cases, which simplifies the case-acquisition task.

As already mentioned above, the CBR Client Tool 200 of the example manifestation can start case acquisition also from a partially completed case, see "Continued Case Acquisition" option in the New Menu 52 in FIG. 5. This aspect of the method and system is useful for completing cases after missing concepts have been added to the model 1. Moreover, it also opens the possibility of using it to complete some partially solved real-world cases. For example, in situations where a CBR system could not automatically solve a problem and the problem solving had to be completed by a human expert and a transcript or some other record of the user-to-expert conversation is available, this record can be used as source of information needed to complete the missing portion of the case.

It will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention as defined in the appended claims.

I claim:

1. For the purpose of acquiring cases for an incremental Case-Based Reasoning (CBR) system having a model defining a hierarchy of concepts and their relationships, the model being used among other things to formalize the structure and content of cases used in the CBR system, the CBR system also having a component for storing information acquired from a user of the CBR system into a session case in such a manner that the acquired information is represented in the session case in terms defined by the model, a computer-based case-acquisition system comprising:
a processor;
a memory;
a first component configured to determine a plurality of applicable potential information acquisition actions, the input to the first component comprising the session case and the model;
a second component configured to present the potential information acquisition actions to a user and providing means for the user to choose from the said actions;
wherein the information acquired by the CBR system as the result of performing the chosen information acquisition action is stored into the session case using the information storing component of the CBR system;
wherein the first and second components are employed one or more times in order to complete the acquisition of the session case.

2. The computer-based system of claim 1, further comprising a component configured to provide means of designating certain pieces of the information submitted during the said information acquisition actions as representing generalizations of the corresponding concepts from the said model.

3. The computer-based system of claim 1, further comprising a component configured to provide means of entering requests to extend the said model.

4. The computer-based system of claim 3, further comprising a component configured to store a partially-complete session case in non-volatile computer memory or media in such a manner that the stored session case can be used as input to the first component in order to resume case acquisition with the stored session case.

5. The computer-based system of claim 1, further comprising a component configured to store the complete session case into the case-base of the CBR system.

6. The computer-based system of claim 2, further comprising a component configured to store the complete session case into the case-base of the CBR system.

7. The computer-based system of claim 3, further comprising a component configured to store the complete session case into the case-base of the CBR system.

8. The computer-based system of claim 4, further comprising a component configured to store the complete session case into the case-base of the CBR system.

9. For the purpose of acquiring cases for an incremental CBR system having a model defining a hierarchy of concepts and their relationships, the model being used among other things to formalize the structure and content of cases used in the CBR system, the CBR system also having a component for storing information acquired from a user of CBR system into a session case in such a manner that the acquired information is represented in the session case in terms defined by the model, a computer-implemented method for conducting case acquisition, the said method comprising the steps of:

step one of reading input data, the input data comprising the model and the session case;

step two of analyzing by a computing device the data read in step one and determining a plurality of applicable potential information acquisition actions;

step three of presenting via a computer user interface the potential information acquisition actions to a user and allowing the user to choose from the said actions;

step four of submitting the chosen actions to the CBR system for execution, wherein one or more pieces of information acquired by the CBR system as the result of executing the chosen information acquisition action is stored into the session case using the information storing component of the CBR system;

wherein, steps one through four are executed one or more times in order to complete the acquisition of the session case.

10. The computer-implemented method of claim 9, further comprising a step of designating via a computer user interface certain pieces of the information submitted during the said information acquisition actions as representing generalizations of the corresponding concepts from the said model.

11. The computer-implemented method of claim 9, further comprising a step of entering requests to extend the said model.

12. The computer-implemented method of claim 11, further comprising storing a partially-complete session case in non-volatile computer memory or media in such a manner that step one can read the stored session case as input in order to resume case acquisition with the stored session case.

13. The computer-implemented method of claim 9, further comprising a step of storing the complete session case into the case-base of the CBR system.

14. The computer-implemented method of claim 10, further comprising a step of storing the complete session case into the case-base of the CBR system.

15. The computer-implemented method of claim 11, further comprising a step of storing the complete session case into the case-base of the CBR system.

16. The computer-implemented method of claim 12, further comprising a step of storing the complete session case into the case-base of the CBR system.

* * * * *